US009400186B1

(12) United States Patent
Bank et al.

(10) Patent No.: US 9,400,186 B1
(45) Date of Patent: Jul. 26, 2016

(54) INTEGRATION OF HISTORICAL USER EXPERIENCE ANALYTICS INTO ROUTE RECOMMENDATIONS

(71) Applicant: International Business Machines Corporation, Armonk, NY (US)

(72) Inventors: Judith H. Bank, Cary, NC (US); Liam S. Harpur, Dublin (IE); Ruthie D. Lyle, Durham, NC (US); Patrick J. O'Sullivan, Dublin (IE); Lin Sun, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/623,266

(22) Filed: Feb. 16, 2015

(51) Int. Cl.
*G01C 21/00* (2006.01)
*G01C 21/34* (2006.01)
*G06Q 30/02* (2012.01)
*G01C 21/36* (2006.01)

(52) U.S. Cl.
CPC ........ *G01C 21/3492* (2013.01); *G01C 21/3484* (2013.01); *G01C 21/3617* (2013.01); *G06Q 30/0261* (2013.01)

(58) Field of Classification Search
CPC ........... G01C 21/3484; G01C 21/3617; G06Q 30/0261; G06Q 30/02; G06Q 10/047
USPC ........ 701/410, 424, 439, 532, 538; 705/14.58
See application file for complete search history.

(56) References Cited

U.S. PATENT DOCUMENTS

| 8,478,642 | B2 | 7/2013 | Dey et al. |
| 8,521,128 | B1 | 8/2013 | Welsh et al. |
| 2010/0205060 | A1* | 8/2010 | Athsani ............. G01C 21/3484 705/14.58 |
| 2012/0123667 | A1 | 5/2012 | Gueziec |

(Continued)

FOREIGN PATENT DOCUMENTS

| WO | 2013083487 A1 | 6/2013 |
| WO | 2013101318 A1 | 7/2013 |

OTHER PUBLICATIONS

Jordan Kahn, Apple details Waze-like crowd-sourced route ratings and incident reporting for real-time traffic alerts in Maps, 9to5Mac Journal, Jul. 4, 2013, pp. 1-5, 9TO5, Published online at: 9to5mac.com/2013/07/04/apple-details-waze-like-crowd-sourced-route-ratings-and-incident-reporting-for-real-time-traffic-alerts-in-maps/.

(Continued)

*Primary Examiner* — Gertrude Arthur Jeanglaud
(74) *Attorney, Agent, or Firm* — Lee Law, PLLC; Christopher B. Lee

(57) ABSTRACT

Situational traveler experiences are collected over time from a number of diverse travelers. The situational traveler experiences are associated with one or more locations traversed by the number of diverse travelers using previous travel route recommendations. Contextual categories of the situational traveler experiences are identified. Historical analytics are performed on the collected situational traveler experiences within the contextual categories of the situational traveler experiences. A historically-contextual travel route suggestion, derived from the historical analytics performed on the collected situational traveler experiences within the contextual categories of the situational traveler experiences, is provided as part of a new travel route recommendation requested by a new traveler.

20 Claims, 4 Drawing Sheets

(56) References Cited

U.S. PATENT DOCUMENTS

2012/0271541 A1* 10/2012 Hjelm ............... G01C 21/3484
701/410
2013/0245930 A1 9/2013 Husain et al.

OTHER PUBLICATIONS

IBM, A Method and System for Associating and Retrieving Contextual Information Corresponding to a Route Map, IP Disclosure IPCOM000190235D, Nov. 23, 2009, pp. 1-3, IP.com, Published online at: http://ip.com/IPCOM/000190235.

Author Unknown, A Method for Social Collaborative Navigation in a Dynamic Environment, IP Disclosure IPCOM000215796D, Mar. 12, 2012, pp. 1-4, IP.com, Published online at: http://ip.com/IPCOM/000215796.

Author Unknown, Free Community-based Mapping, Traffic & Navigation App, Waze.com webpage/site, Printed from website on Feb. 13, 2015, pp. 1-3, Waze Mobile, Published online at: http://www.waze.com/.

Author Unknown, Real Time Crowdsourced Road Tips to Avoid Traffic Jams, Dailycrowdsource.com webpage/site, Printed from website on Feb. 13, 2015, pp. 1-5, Daily Crowdsource, Published online at: http://dailycrowdsource.com/20-resources/projects/346-real-time-crowdsourced-road-tips-to-avoid-traffic-jams.

* cited by examiner

INTEGRATION OF HISTORICAL USER EXPERIENCE ANALYTICS INTO ROUTE RECOMMENDATIONS

BACKGROUND

The present invention relates to route recommendations for travelers. More particularly, the present invention relates to integration of historical user experience analytics into route recommendations.

Travelers traditionally have used paper maps for planning travel between a starting location and a destination location. Technologies, such as global positioning systems (GPS) technology and electronic mapping applications, allow users to plan routes between a starting location and a destination location using a navigation system installed within their vehicle or mobile device.

BRIEF SUMMARY

A computer-implemented method includes: collecting over time, from a plurality of diverse travelers, situational traveler experiences associated with one or more locations traversed by the plurality of diverse travelers using previous travel route recommendations; identifying contextual categories of the situational traveler experiences; performing historical analytics on the collected situational traveler experiences within the contextual categories of the situational traveler experiences; and providing, as part of a new travel route recommendation requested by a new traveler, a historically-contextual travel route suggestion derived from the historical analytics performed on the collected situational traveler experiences within the contextual categories of the situational traveler experiences.

A system that performs the method and a computer program product that causes a computer to perform the method are also described.

DETAILED DESCRIPTION

Figure 1:
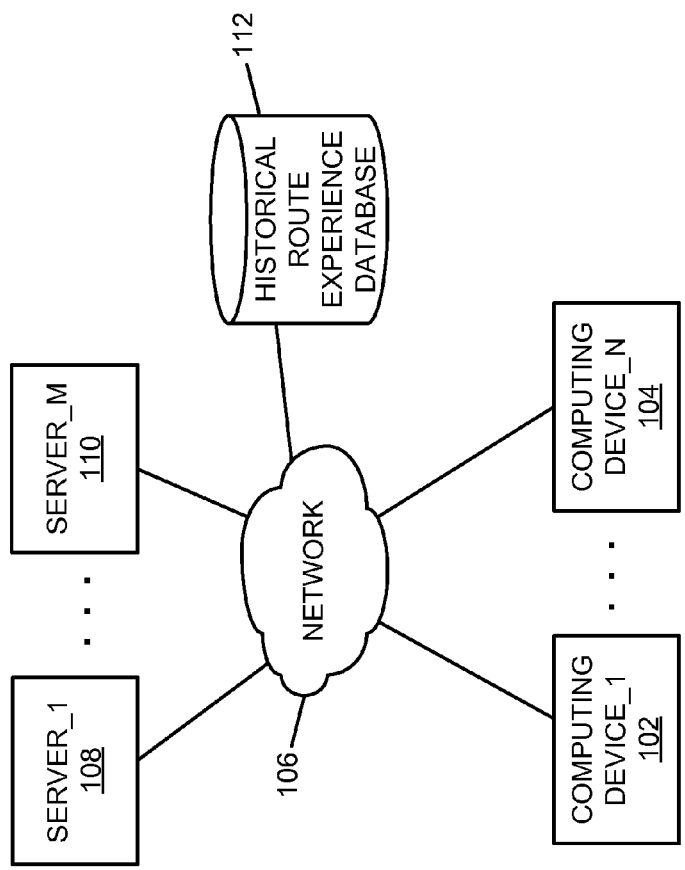
FIG. 1 is a block diagram of an example of an implementation of a system for integration of historical user experience analytics into route recommendations according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides integration of historical user experience analytics into route recommendations. The present technology solves a recognized problem with provided travel routes by providing technology that includes a new form of computing service that analyzes historical problems travelers have had along travel routes that uses analytical computational processing of this historical information to enhance future route recommendations including cautionary or other information that has been historically accumulated during the analysis. The present technology captures user experiences in association with points along a travel route and incorporates this information into a navigation system. Historical analytics are performed to determine quantities of people that have similar experiences associated with the particular travel route/recommendation. A historical route situational context model may be formulated and analyzed. The historical route situational context model may include contextual categories of situational traveler experiences, such as categories based upon similar weather circumstances, similar traffic circumstances, and other similarities that may be categorized and processed within the historical route situational context model. Where the historical analytics suggest a pattern of inefficiency for travelers or a repeated avoidable dangerous situation, the travel route may be augmented with enhanced historical user-experience travel recommendations, and the enhanced routing information may be provided to future route requesters. The enhanced navigation system described herein infers and leverages historical information related to travel routes provided by or obtained in association with a diverse set of users under a diverse set of contexts for a particular route (e.g., roadway, time, etc.). As such, the enhanced navigation system provides information that a traveler may not otherwise be able to obtain that may improve travel enjoyment and travel safety.

The enhanced navigation system described herein captures traveler experiences and travel feedback in association with situational context, such as time of day and roadway conditions (e.g., road, traffic, or weather). The situational context may be determined from one or more information sources, such as weather service websites or other sources. For example, it may be determined that an exit was missed by a traveler at a time of low traffic, high fog, and slick road conditions, using a variety of different information sources.

Travelers may provide feedback on travel routes during travel or may have a touchscreen tag that may be pressed to create a reminder for the traveler to provide travel feedback at a completion of travel or at a safe point along the travel route. The user may provide travel feedback by speaking into a voice recognition unit that converts spoken words to text, or may provide travel feedback by text entry. The travel feedback may be captured and transmitted to the enhanced navigation system for analysis in conjunction with feedback from other travelers to identify historical trends/issues related to particular routes traversed by multiple travelers.

Alternatively, in conjunction with global positioning service (GPS) or other location technology, the enhanced navigation system may automatically determine that a user missed an exit along the route. The enhanced navigation system may automatically determine that the user circled back to the exit. The enhanced navigation system may thereby keep track of the number of drivers that exhibit similar behavior, and may infer enhanced route recommendations without direct traveler feedback.

Whether traveler route feedback is directly provided by travelers or inferred using navigation technologies, the enhanced navigation system may learn over time as more experiences are captured, incorporated into the routing system, and historically analyzed. The enhanced navigation system may determine the historical frequency of travel errors to guide other travelers. Emphasis on or inclusion of crowd-sourced historical recommendations may be directly correlated with a number of people who provided information. Analysis of historical user-experiences may improve over time using the historical recommendations to provide hints or tips for users at particular points along a travel route. For example, where the enhanced navigation system described herein determines that a given percentage (e.g., seventy three percent (73%)) of travelers miss a given exit along a particular portion of a route due to roadway conditions during a time of day during which a new traveler is requesting a travel route or traveling, the routing system described herein may suggest that the driver begin migrating across traffic lanes earlier than under different roadway conditions so that the driver may avoid missing the turn. This form of enhanced historical user-experience travel recommendations improve both travel efficiency and travel safety.

Client navigation application preference settings on a client device (e.g., in vehicle or mobile handheld) may be used by a traveler to indicate when and how the traveler would like to receive enhanced travel recommendations. For example, a user may specify presentation of enhanced travel recommendations in an audible manner (e.g., using text to speech) with driving directions, as a text pop up in the map interface accessible through touch interactions, or as a customized "lane assist" directive that is presented as part of the route based on a pending tip.

The traveler may further specify filtering of enhanced route recommendations. For example, the traveler may control the amount of enhanced routing information presented to the user by specification of a crowd-source threshold that specifies a configurable percentage of travelers that left the same or similar feedback before the feedback is to be presented to the traveler (e.g., only provide information provided by seventy-five percent (75%) of previous travelers). The traveler may further configure a roadway condition context for recommendations (e.g., receive recommendations obtained during specific types of roadway, weather, or driving conditions). The traveler may further configure a time context for recommendations (e.g., received recommendations obtained during a particular time period, such as rush hour). Many other possibilities for enhanced route recommendation filtering are possible, and all such possibilities are considered within the scope of the present subject matter.

It should be noted that conception of the present subject matter resulted from recognition of certain limitations associated with travel route recommendations. For example, it was observed that using previous technologies, travel route recommendations are limited to driving directions. However, it was additionally observed that certain forms of repeating events, such as a user missing a planned turn, may be the result of conditions other than the directions provided by the particular navigation system. For example, using previous technologies, a user may request driving directions to a restaurant using the navigation client application on a mobile device or in a vehicle, and may follow the driving directions, but may still inadvertently miss a key exit because the driver was unable to merge over to the exit lane because of traffic, weather, or because the exit was not clearly visible. It was observed that in such a situation, the driver must circle back to take the appropriate exit, which causes delay for the driver and further causes the driver to have to travel the same roadway again during the same congested traffic or adverse weather conditions (thereby increasing the traffic congestion problem and decreasing travel safety). It was further determined that it would be beneficial to future travelers to know to merge earlier or to advise the future travelers that the exit is not clearly visible without first merging toward the exit direction under certain traffic or weather conditions, or times of day. It was determined that there is a technology gap within these previous technologies because these previous technologies do not capture or analyze user experiences as they travel or as they complete a particular travel route, and do not subsequently incorporate this form of historical travel information input and analytics into a navigation system to enhance navigation suggestions for future travel route requests. Continuing with the example above, given the opportunity, the traveler that missed the exit may comment that "I was following the travel recommendations, but I missed my turn because of heavy traffic and the exit was not clearly visible in time for me to merge to the correct lane," and may further comment that "I would suggest merging toward the exit a half mile earlier." The present subject matter recognizes this technology gap and improves travel route recommendations by providing for integration of historical user experience analytics into route recommendations, as described above and in more detail below. As such, improved route recommendations and travel safety may be obtained through use of the present technology.

The integration of historical user experience analytics into route recommendations described herein may be performed in real time to allow prompt suggestions travelers regarding issues that previous travelers have experienced during particular times of travel and under particular traffic or weather conditions similar to those of a new traveler that has requested a travel route. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for integration of historical user experience analytics into route recommendations. A computing device_1 102 through a computing device_N 104 communicate via a network 106 with several other devices. The other devices include a server_1 108 through a server_M 110, and a historical route experience database 112.

As will be described in more detail below in association with FIG. 2 through FIG. 4, the computing device_1 102 through the computing device_N 104 and/or the server_1 108 through the server_M 110 may each provide automated integration of historical user experience analytics into route recommendations. The automated integration of historical user experience analytics into route recommendations is based upon evaluation and analysis of feedback regarding travel problems that previous users have experienced along travel routes, such as missing an exit because of weather conditions or traffic during certain times of day. The automated integration of historical user experience analytics into route recommendations may provide improved safety and efficiency for travelers by incorporating statistical analytics into route recommendations with suggestions to improve both travel safety and efficiency of travel. As such, the present technology may be implemented at a user computing device or server device level, or by a combination of such devices as appropriate for a given implementation. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The historical route experience database 112 may include a relational database, an object database, or any other storage type of device. As such, the historical route experience database 112 may be implemented as appropriate for a given implementation.

Figure 2:
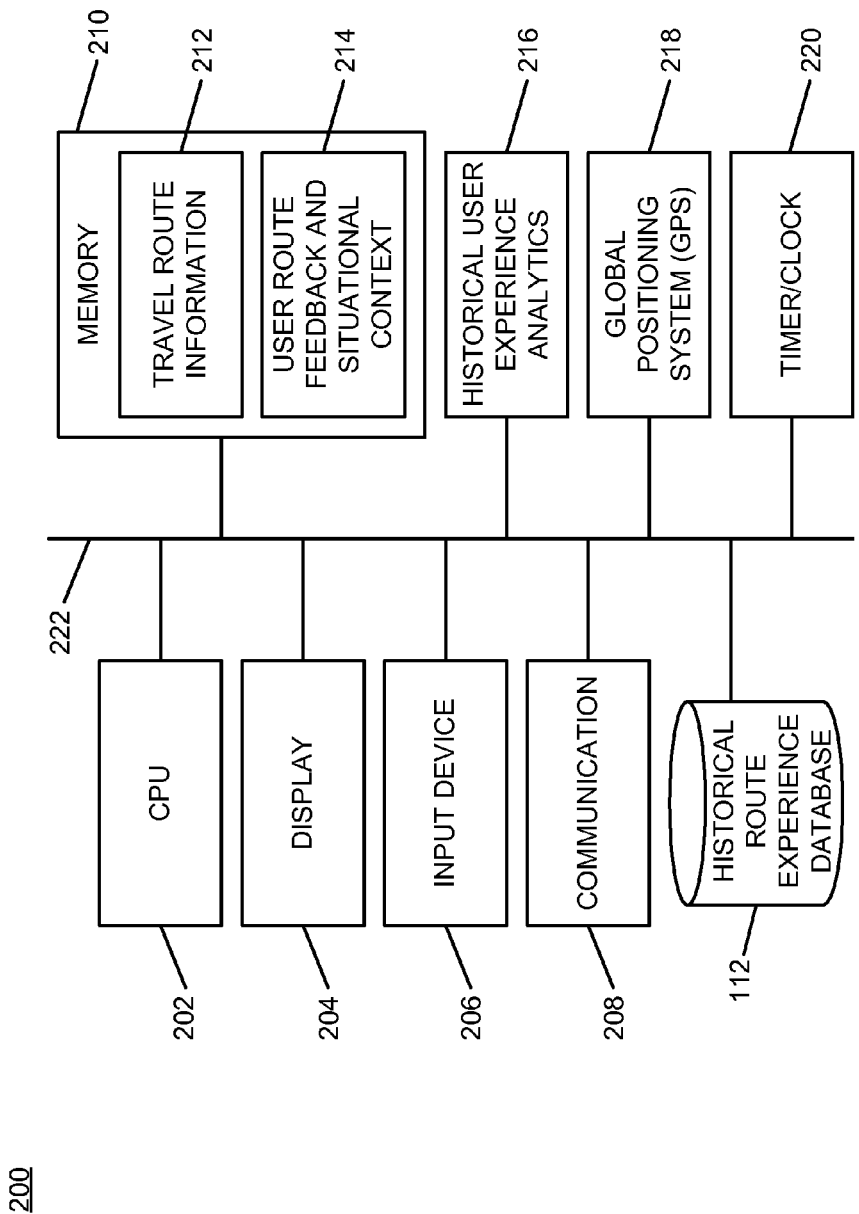
FIG. 2 is a block diagram of an example of an implementation of a core processing module capable of performing integration of historical user experience analytics into route recommendations according to an embodiment of the present subject matter.

FIG. 2 is a block diagram of an example of an implementation of a core processing module 200 capable of performing integration of historical user experience analytics into route recommendations. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of historical user experience analytics for integration into route recommendations in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a travel route information storage area 212 that stores travel routes that may be provided by core processing module 200. The memory 210 also includes a user route feedback and situational context storage area 214 that stores user feedback and any situational context (e.g., traffic conditions, weather conditions, etc.) associated with the user feedback.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A historical user experience analytics module 216 is also illustrated. The historical user experience analytics module 216 provides analytical processing of historical user feedback associated with travel routes, and provides recommendations with new travel route requests based upon the historical user feedback analytics, as described above and in more detail below. The historical user experience analytics module 216 implements the automated integration of historical user experience analytics into route recommendations of the core processing module 200.

It should also be noted that the historical user experience analytics module 216 may form a portion of other circuitry described without departure from the scope of the present subject matter. Further, the historical user experience analytics module 216 may alternatively be implemented as an application stored within the memory 210. In such an implementation, the historical user experience analytics module 216 may include instructions executed by the CPU 202 for performing the functionality described herein. The CPU 202 may execute these instructions to provide the processing capabilities described above and in more detail below for the core processing module 200. The historical user experience analytics module 216 may form a portion of an interrupt service routine (ISR), a portion of an operating system, a portion of a browser application, or a portion of a separate application without departure from the scope of the present subject matter.

A global positioning system (GPS) module 218 provides positioning location coordinates usable for identifying geographic locations associated with travel route requests. Location identification information generated by the GPS module 218 may be stored within the travel route information storage area 212 for use by the historical user experience analytics module 216.

A timer/clock module 220 is illustrated and used to determine timing and date information, such as times/dates associated with travel route requests, as described above and in more detail below. As such, the historical user experience analytics module 216 may utilize information derived from the timer/clock module 220 for information processing activities, such as the integration of historical user experience analytics into route recommendations.

The historical route experience database 112 is again shown within FIG. 2 associated with the core processing module 200. As such, the historical route experience database 112 may be operatively coupled to the core processing module 200 without use of network connectivity, as appropriate for a given implementation.

The CPU 202, the display 204, the input device 206, the communication module 208, the memory 210, the historical user experience analytics module 216, the GPS module 218, the timer/clock module 220, and the historical route experience database 112 are interconnected via an interconnection 222. The interconnection 222 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located within a vehicle, on a mobile device, or other location, while the CPU 202 and memory 210 may be located at a local or remote server. Many other possible arrangements for components of the core processing module 200 are possible and all are considered within the scope of the present subject matter. It should also be understood that, though the historical route experience database 112 is illustrated as a separate component for purposes of example, the information stored within the historical route experience database 112 may also/alternatively be stored within the memory 210 without departure from the scope of the present subject matter. Accordingly, the core processing module 200 may take many forms and may be associated with many platforms.

Figure 3:
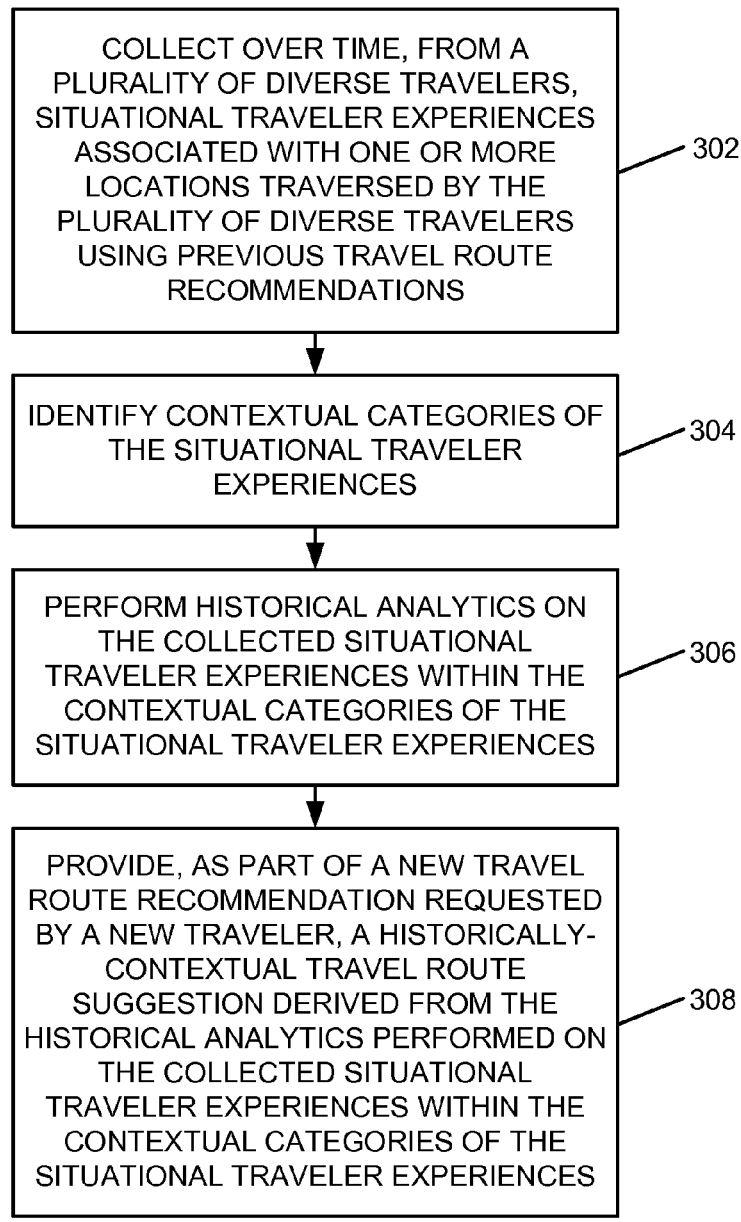
FIG. 3 is a flow chart of an example of an implementation of a process for integration of historical user experience analytics into route recommendations according to an embodiment of the present subject matter.
Figure 4:
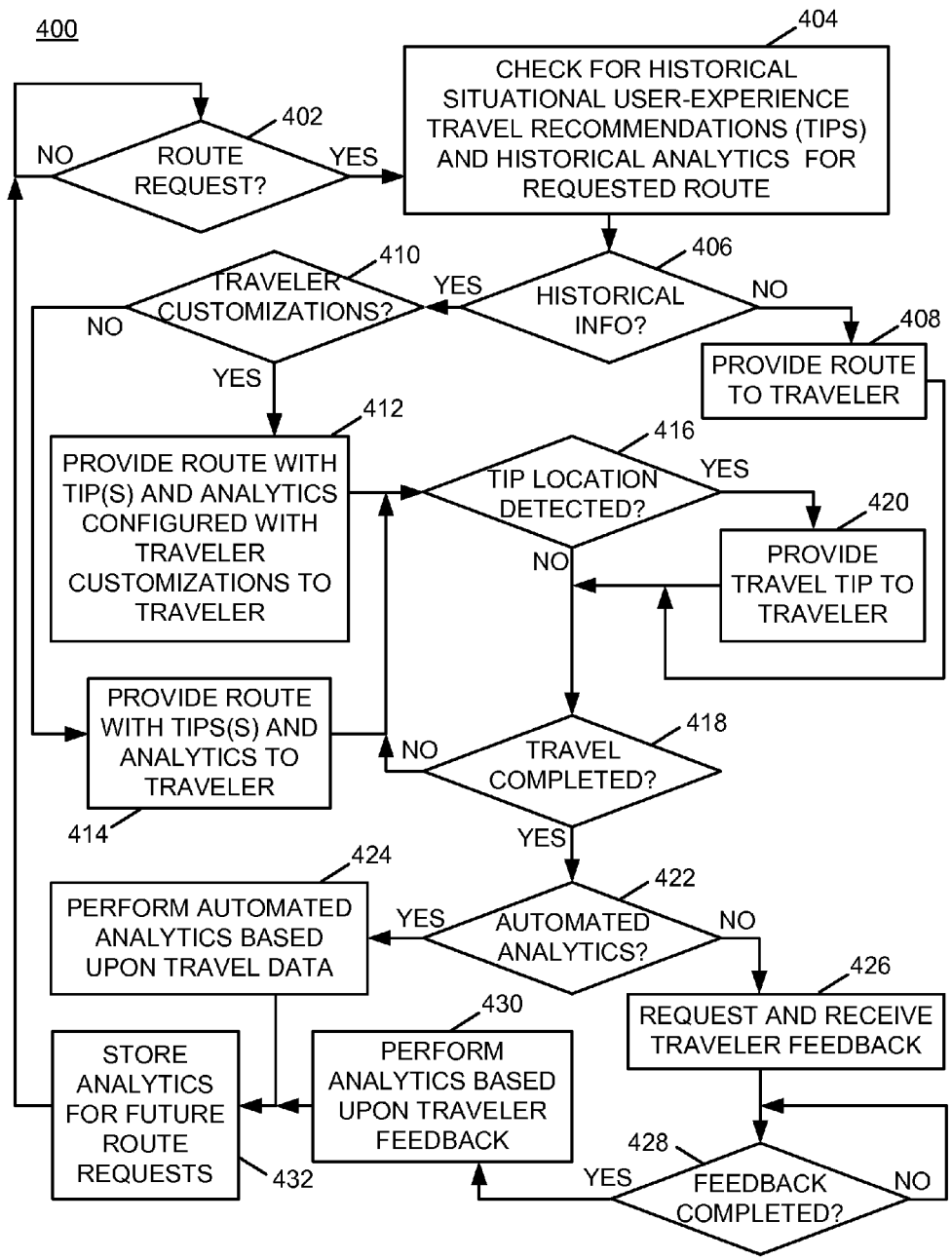
FIG. 4 is a flow chart of an example of an implementation of a process for integration of historical user experience analytics into route recommendations that allows traveler customizations for presentation of the historical user experience analytics according to an embodiment of the present subject matter.

FIG. 3 through FIG. 4 described below represent example processes that may be executed by devices, such as the core processing module 200, to perform the automated integration of historical user experience analytics into route recommendations associated with the present subject matter. Many other variations on the example processes are possible and all are considered within the scope of the present subject matter. The example processes may be performed by modules, such as the historical user experience analytics module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for integration of historical user experience analytics into route recommendations. The process 300 represents a computer-implemented method of performing the automated integration of historical user experience analytics into route recommendations described herein. At block 302, the process 300 collects over time, from a plurality of diverse travelers, situational traveler experiences associated with one or more locations traversed by the plurality of diverse travelers using previous travel route recommendations. At block 304, the process 300 identifies contextual categories of the situational traveler experiences. At block 306, the process 300 performs historical analytics on the collected situational traveler experiences within the contextual categories of the situational traveler experiences. At block 308, the process 300 provides, as part of a new travel route recommendation requested by a new traveler, a historically-contextual travel route suggestion derived from the historical analytics performed on the collected situational traveler experiences within the contextual categories of the situational traveler experiences.

FIG. 4 is a flow chart of an example of an implementation of a process 400 for integration of historical user experience analytics into route recommendations that allows traveler customizations for presentation of the historical user experience analytics. The process 400 represents a computer-implemented method of performing the automated integration of historical user experience analytics into route recommendations described herein. At decision point 402, the process 400 makes a determination as to whether a travel route request has been detected. A travel route request may be detected, for example, in response to user input of starting and ending locations by use of a user interface (UI) provided to the user at a client device. The travel route request may be detected at either a client device or at a server device in response to receipt of the request from the client device, and appropriate processing for the particular implementation may be performed to communicate the travel route request. A resulting recommended travel route with a historically-contextual route suggestion derived from the historical analytics performed on previous collected situational traveler experiences may be delivered to the requesting traveler, as described in more detail below. It should be noted that the provided UI also allows users to provide the situational traveler experiences as user situational feedback input regarding the previous route recommendations into a historical route situational context model, as also described in more detail below.

In response to determining at decision point 402 that a travel route request has been detected, the process 400 checks for historical situational user-experience travel recommendations (e.g., tips, suggestions, etc.) and historical analytics for the requested route at block 404. The process 400 may check the historical route experience database 112 and/or the user route feedback and situational context storage area 214 of the memory 210 to identify a historical route situational context model. The historical route situational context model may include contextual categories of the situational traveler experiences. Where the historical route situational context model does not yet exist, the processing at block 404 may include formulating a historical route situational context model usable to identify route recommendations in accordance with the contextual categories of the situational traveler experiences, and may include capturing the situational traveler experiences associated with the one or more locations traversed by a diverse group of travelers using previous route recommendations into the contextual categories of situational traveler experiences within the formulated historical route situational context model, as appropriate for the given implementation.

At decision point 406, the process 400 makes a determination as to whether historical information associated with the requested travel route has been identified. In response to determining that no historical information associated with the requested travel route has been identified, the process 400 provides the travel route to the traveler at block 408, and begins iterative processing to determine whether travel has been completed to request user feedback for the new travel route that does not yet have associated historical information. The description of the iterative processing to determine whether travel has been completed to request user feedback for the new travel route that does not yet have associated historical information will be described in more detail further below.

It should be noted that travel tips and user feedback may be received from other travelers while the traveler is traveling along a requested travel route. As such, even where no historical information is associated with a travel route at a time of a travel request, historical information may be obtained either prior to travel by the user or during travel. As such, the processing described below considers historical information that is received from other travelers and that is evaluated as pertinent to the new travel request at any time prior to completion of the travel.

With further reference to decision point 406, in response to determining that historical information associated with the requested travel route has been identified, the process 400 makes a determination at decision point 410 as to whether the traveler has requested any customizations regarding how historical situational information about travel routes is to be used and/or presented to the traveler. For example, the user may specify that only historical information associated with a particular portion of a travel route, a particular time, particular weather patterns, or other situational preferences be provided to the user. As such, the traveler may specify criteria usable to filter or augment the historical situational information that is provided to the traveler.

In response to determining that the traveler has requested any customizations regarding how historical situational information about travel routes is to be used and/or presented to the traveler at decision point 410, the process 400 provides the travel route with the travel recommendations (e.g., tips, etc.) and the historical analytics configured with the traveler customizations to the traveler at block 412. Alternatively, in response to determining that the traveler has not requested any customizations regarding how historical situational information about travel routes is to be used and/or presented to the traveler at decision point 410, the process 400 provides the travel route with the travel recommendations (e.g., tips, etc.) and the historical analytics to the traveler at block 414.

In response to either providing the travel route, travel recommendations, and the historical analytics with or without the traveler customizations to the traveler at blocks 412 and 414, respectively, the process 400 enters higher-level iterative processing. The process iterates between determining at decision point 416 whether a tip location (e.g., a recommendation location) associated with the travel route has been detected (e.g., by GPS, time, weather, etc.) and determining at decision point 418 whether travel is completed.

In response to determining at decision point 416 that a tip location associated with the travel route (e.g., a location associated with a navigation recommendation) has been detected, the process 400 provides the travel tip (e.g., navigation recommendation) to the traveler at block 420. Providing the travel tip may include identifying, within a historical route situational context model that captures into the contextual categories of situational traveler experiences, the collected situational traveler experiences that are pertinent to the new route recommendation. The contextual categories of the traveler experiences may be selected from a group such as a traffic conditions category, a time of day category, a weather conditions category, a percentage of drivers missing an exit category, and a road conditions category. The pertinent navigation suggestions/recommendations associated with the situational traveler experiences identified within the historical route situational context model may be provided to the new traveler along with the new travel route recommendation.

Responsive to providing the travel tip to the traveler at block 420 or, returning to the description of block 408, in response to providing the route to the traveler at block 408, the process 400 makes a determination at decision point 418 as to whether travel is completed. Responsive to determining that travel is not yet completed, the process 400 returns to decision point 416 and iterates as described above to provide travel tips to the traveler along the travel route. As also described above, travel tips may be received from other travelers during the travel and integrated to form situational historical route information that was not available when a traveler first requested a route. As such, the process 400 may continually integrate new situational context information to form or improve the historical situational context information over time.

In response to determining at decision point 418 that travel is completed, the process 400 makes a determination at decision point 422 as to whether to perform automated (e.g., programmatic) analytics on the travel route as an affirmative decision, or whether to request user feedback regarding situational traveler experiences for the travel route as an alternative determination. It should be noted that some travelers may defer providing feedback, and the process 400 may prompt the user via the UI to provide feedback. Even where user feedback is not requested or does not provide feedback, the process 400 may detect during travel (e.g., by GPS) that a user, for example, missed a suggested exit of the travel route and looped back during travel to take the suggested exit of the travel route. The process 400 may determine time, weather, traffic, and other situational context information, such as by use of one or more external services, and may perform automated analytics to derive historical situational context information that may have resulted in the missed exit by the traveler. It should be noted that the programmatic analytics may be combined with user feedback, and the process 400 may be modified to iterate through either branch of processing in any order as appropriate for the given implementation.

In response to determining at decision point 422 to perform automated analytics, the process 400 performs automated analytics based upon travel data associated with the travel route at block 424. Alternatively, in response to determining at decision point 422 to request user feedback regarding situational traveler experiences for the travel route, the process 400 requests and receives traveler feedback at block 426. At decision point 428, the process 400 makes a determination as to whether the traveler feedback is completed. In response to determining that the traveler feedback is completed, the process 400 performs analytics based upon the traveler feedback at block 430. The process 400 may alternatively proceed to block 424 as described above to perform additional automated analytics. In response to performing the automated analytics based upon travel data associated with the travel route at block 424, or in response to performing the analytics based upon the traveler feedback at block 430, the process 400 stores the analytics for future route requests at block 432.

It should be noted that the processing performed at block 424 and 430 may include determining, within a historical route situational context model that captures into the contextual categories of situational traveler experiences, similarities among the collected situational traveler experiences. The processing my further include identifying the determined similarities as the historically-contextual route suggestion that is provided as part of the new travel route recommendation requested by a new traveler. The determined similarities among the collected situational traveler experiences within the historical route situational context model may include similarities with respect to situational travel context that is contemporaneously associated with travel by a diverse group of travelers using the previous route recommendations. The situational travel context may further include at least one of traffic conditions, time of day, weather conditions, percentage of drivers missing an exit, and road conditions.

As such, the process 400 provides historical situational user-experience travel recommendations (e.g., tips, suggestions, etc.) and historical analytics to new travelers that request travel routes. Travelers may request customizations regarding how the historical situational travel route information is to be provided to them, and travel tips may be provided to the travelers along travel routes based upon detected travel locations along the travel routes. Analytics may be performed autonomously and/or based upon traveler situational feedback. The process 400 may grow a database of historical situational context information for travel routes over time and may adjust the recommendations provided as information changes over time (e.g., construction has completed and no more suggestions are received regarding travel problems due to the previous construction). Accordingly, the process 400 provides a dynamic infrastructure of processing that may be distributed between client devices and server devices, and may learn over time to further improve travel recommendations provided in association with travel routes.

As described above in association with FIG. 1 through FIG. 4, the example systems and processes provide integration of historical user experience analytics into route recommendations. Many other variations and additional activities associated with integration of historical user experience analytics into route recommendations are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:
   collecting over time, from a plurality of diverse travelers, adverse situational travel experiences associated with traveling along a travel route used during travel by the plurality of diverse travelers responsive to previous travel route recommendations;
   identifying contextual categories of the adverse situational travel experiences associated with traveling along the travel route;
   performing historical analytics on the collected adverse situational travel experiences associated with traveling along the travel route within the contextual categories of the adverse situational travel experiences; and
   providing, as part of a new travel route recommendation that recommends the travel route to a new traveler, a historically-contextual travel route suggestion, derived from the historical analytics performed on the collected adverse situational travel experiences associated with traveling along the travel route within the contextual categories of the adverse situational travel experiences, that improves travel of the new traveler while traveling along the travel route.

2. The computer-implemented method of claim 1, where collecting over time, from the plurality of diverse travelers, the adverse situational travel experiences associated with traveling along the travel route used during travel by the plurality of diverse travelers responsive to the previous travel route recommendations comprises:
   formulating a historical travel route situational context model usable to identify travel route recommendations in accordance with the contextual categories of the adverse situational travel experiences; and
   capturing the adverse situational travel experiences associated with traveling along the travel route used during travel by the plurality of diverse travelers responsive to the previous travel route recommendations into the contextual categories of the adverse situational travel experiences within the formulated historical travel route situational context model.

3. The computer-implemented method of claim 1, where performing historical analytics on the collected adverse situational travel experiences associated with traveling along the travel route within the contextual categories of the adverse situational travel experiences comprises:
   determining, within a historical travel route situational context model that captures into the contextual categories of the adverse situational travel experiences, similarities among the collected adverse situational travel experiences; and identifying the determined similarities as the historically-contextual travel route suggestion that is provided as part of the new travel route recommendation that recommends the travel route to the new traveler.

4. The computer-implemented method of claim 3, where the determined similarities among the collected adverse situational travel experiences within the historical travel route situational context model comprise similarities in at least one of traffic conditions, time of day, weather conditions, percentage of drivers missing an exit, and road conditions associated with traveling along the travel route used during travel by the plurality of diverse travelers.

5. The computer-implemented method of claim 1, where providing, as part of the new travel route recommendation that recommends the travel route to the new traveler, the historically-contextual travel route suggestion, derived from the historical analytics performed on the collected adverse situational travel experiences associated with traveling along the travel route within the contextual categories of the adverse situational travel experiences, that improves the travel of the new traveler while traveling along the travel route comprises:

identifying, within a historical travel route situational context model that captures into the contextual categories of the adverse situational travel experiences, the collected adverse situational travel experiences that are pertinent to contemporaneous travel along the travel route at a travel time associated with the new travel route recommendation; and providing the pertinent adverse situational travel experiences identified within the historical travel route situational context model to the new traveler along with the new travel route recommendation.

6. The computer-implemented method of claim 1, where the contextual categories of the adverse situational travel experiences are selected from a group consisting of a traffic conditions category, a time of day category, a weather conditions category, a percentage of drivers missing an exit category, and a road conditions category.

7. The computer-implemented method of claim 1, further comprising providing a user interface (UI) that allows users to provide the adverse situational travel experiences as user situational travel feedback input regarding traveling along the travel route in association with the previous travel route recommendations into a historical travel route situational context model.

8. A system, comprising:
a memory; and
a processor programmed to:
collect within the memory over time, from a plurality of diverse travelers, adverse situational travel experiences associated with traveling along a travel route used during travel by the plurality of diverse travelers responsive to previous travel route recommendations;
identify contextual categories of the adverse situational travel experiences associated with traveling along the travel route;
perform historical analytics on the collected adverse situational travel experiences associated with traveling along the travel route within the contextual categories of the adverse situational travel experiences; and
provide, as part of a new travel route recommendation that recommends the travel route to a new traveler, a historically-contextual travel route suggestion, derived from the historical analytics performed on the collected adverse situational travel experiences associated with traveling along the travel route within the contextual categories of the adverse situational travel experiences, that improves travel of the new traveler while traveling along the travel route.

9. The system of claim 8, where, in being programmed to collect within the memory over time, from the plurality of diverse travelers, the adverse situational travel experiences associated with traveling along the travel route used during travel by the plurality of diverse travelers responsive to the previous travel route recommendations, the processor is programmed to:
formulate a historical travel route situational context model usable to identify travel route recommendations in accordance with the contextual categories of the adverse situational travel experiences; and
capture the adverse situational travel experiences associated with traveling along the travel route used during travel by the plurality of diverse travelers responsive to the previous travel route recommendations into the contextual categories of the adverse situational travel experiences within the formulated historical travel route situational context model.

10. The system of claim 8, where, in being programmed to perform historical analytics on the collected adverse situational travel experiences associated with traveling along the travel route within the contextual categories of the adverse situational travel experiences, the processor is programmed to:
determine, within a historical travel route situational context model that captures into the contextual categories of the adverse situational travel experiences, similarities among the collected adverse situational travel experiences; and
identify the determined similarities as the historically-contextual travel route suggestion that is provided as part of the new travel route recommendation that recommends the travel route to the new traveler; and
where the determined similarities among the collected adverse situational travel experiences within the historical travel route situational context model comprise similarities in at least one of traffic conditions, time of day, weather conditions, percentage of drivers missing an exit, and road conditions associated with traveling along the travel route used during travel by the plurality of diverse travelers.

11. The system of claim 8, where, in being programmed to provide, as part of the new travel route recommendation that recommends the travel route to the new traveler, the historically-contextual travel route suggestion, derived from the historical analytics performed on the collected adverse situational travel experiences associated with traveling along the travel route within the contextual categories of the adverse situational travel experiences, that improves the travel of the new traveler while traveling along the travel route, the processor is programmed to:
identify, within a historical travel route situational context model that captures into the contextual categories of the adverse situational travel experiences, the collected adverse situational travel experiences that are pertinent to contemporaneous travel along the travel route at a travel time associated with the new travel route recommendation; and
provide the pertinent adverse situational travel experiences identified within the historical travel route situational context model to the new traveler along with the new travel route recommendation.

12. The system of claim 8, where the contextual categories of the adverse situational travel experiences are selected from a group consisting of a traffic conditions category, a time of day category, a weather conditions category, a percentage of drivers missing an exit category, and a road conditions category.

13. The system of claim 8, where the processor is further programmed to provide a user interface (UI) that allows users to provide the adverse situational travel experiences as user situational travel feedback input regarding traveling along the travel route in association with the previous travel route recommendations into a historical travel route situational context model.

14. A computer program product, comprising:
a computer readable storage medium having computer readable program code embodied therewith, wherein the computer readable storage medium is not a transitory signal per se and where the computer readable program code when executed on a computer causes the computer to:
collect over time, from a plurality of diverse travelers, adverse situational travel experiences associated with traveling along a travel route used during travel by the plurality of diverse travelers using responsive to previous travel route recommendations;
identify contextual categories of the adverse situational travel experiences associated with traveling along the travel route;
perform historical analytics on the collected adverse situational travel experiences associated with traveling along the travel route within the contextual categories of the adverse situational travel experiences; and
provide, as part of a new travel route recommendation that recommends the travel route to a new traveler, a historically-contextual travel route suggestion, derived from the historical analytics performed on the collected adverse situational travel experiences associated with traveling along the travel route within the contextual categories of the adverse situational travel experiences, that improves travel of the new traveler while traveling along the travel route.

15. The computer program product of claim 14, where, in causing the computer to collect over time, from the plurality of diverse travelers, the adverse situational travel experiences associated with traveling along the travel route used during travel by the plurality of diverse travelers responsive to the previous travel route recommendations, the computer readable program code when executed on the computer causes the computer to:
formulate a historical travel route situational context model usable to identify travel route recommendations in accordance with the contextual categories of the adverse situational travel experiences; and
capture the adverse situational travel experiences associated with traveling along the travel route used during travel by the plurality of diverse travelers responsive to the previous travel route recommendations into the contextual categories of the adverse situational travel experiences within the formulated historical travel route situational context model.

16. The computer program product of claim 14, where, in causing the computer to perform historical analytics on the collected adverse situational travel experiences associated with traveling along the travel route within the contextual categories of the adverse situational travel experiences, the computer readable program code when executed on the computer causes the computer to:
determine, within a historical travel route situational context model that captures into the contextual categories of the adverse situational travel experiences, similarities among the collected adverse situational travel experiences; and
identify the determined similarities as the historically-contextual travel route suggestion that is provided as part of the new travel route recommendation that recommends the travel route to the new traveler.

17. The computer program product of claim 16, where the determined similarities among the collected adverse situational travel experiences within the historical travel route situational context model comprise similarities in at least one of traffic conditions, time of day, weather conditions, percentage of drivers missing an exit, and road conditions associated with traveling along the travel route used during travel by the plurality of diverse travelers.

18. The computer program product of claim 14, where, in causing the computer to provide, as part of the new travel route recommendation that recommends the travel route to the new traveler, the historically-contextual travel route suggestion, derived from the historical analytics performed on the collected adverse situational travel experiences associated with traveling along the travel route within the contextual categories of the adverse situational travel experiences, that improves the travel of the new traveler while traveling along the travel route, the computer readable program code when executed on the computer causes the computer to:
identify, within a historical travel route situational context model that captures into the contextual categories of the adverse situational travel experiences, the collected adverse situational travel experiences that are pertinent to contemporaneous travel along the travel route at a travel time associated with the new travel route recommendation; and
provide the pertinent adverse situational travel experiences identified within the historical travel route situational context model to the new traveler along with the new travel route recommendation.

19. The computer program product of claim 14, where the contextual categories of the adverse situational travel experiences are selected from a group consisting of a traffic conditions category, a time of day category, a weather conditions category, a percentage of drivers missing an exit category, and a road conditions category.

20. The computer program product of claim 14, where the computer readable program code when executed on the computer further causes the computer to provide a user interface (UI) that allows users to provide the adverse situational travel experiences as user situational travel feedback input regarding traveling along the travel route in association with the previous travel route recommendations into a historical travel route situational context model.

* * * * *